United States Patent [19]

Tabb

[11] 3,709,195
[45] Jan. 9, 1973

[54] METHOD FOR HATCHING AND GROWING MARINE ORGANISMS

[75] Inventor: Durbin C. Tabb, Miami, Fla.

[73] Assignee: Research Corporation, New York, N.Y.

[22] Filed: July 30, 1970

[21] Appl. No.: 59,508

[52] U.S. Cl. ................................................. 119/2
[51] Int. Cl. .............................................. A01k 61/00
[58] Field of Search....119/2, 3, 5, 15; 114/5 T, 74 T, 114/74.1; 43/55; 47/28.1, 1.2

[56] References Cited

UNITED STATES PATENTS

| 2,008,363 | 7/1935 | Maris | 119/5 |
|---|---|---|---|
| 3,232,272 | 2/1966 | Dosamantes et al. | 119/5 |
| 3,490,416 | 1/1970 | Kelley et al. | 119/5 |
| 2,984,207 | 5/1961 | Drake | 119/2 |
| 2,910,994 | 11/1959 | Joy | 47/28.1 X |
| 3,036,400 | 5/1962 | Anderson | 43/55 |
| 3,067,712 | 12/1962 | Doerpinghaus | 114/74 T |
| 2,804,045 | 8/1957 | Scott | 119/2 |
| 3,477,406 | 11/1969 | Fujinaga | 119/2 |
| 3,273,276 | 9/1966 | Englesson | 43/6.5 |
| 3,282,361 | 11/1966 | Mackie | 114/74 T |
| 3,296,994 | 1/1967 | Schirtzinger | 114/74 T |
| 3,502,046 | 3/1970 | Stauber | 114/.5 T |
| 3,573,934 | 4/1971 | Mitchell | 119/3 |

FOREIGN PATENTS OR APPLICATIONS

| 1,075,888 | 2/1960 | Germany | 47/28.1 |

Primary Examiner—Aldrich F. Medbery
Attorney—Stowell & Stowell

[57] ABSTRACT

A method and apparatus for hatching and growing marine organisms wherein a floatable translucent enclosure, having input devices for introducing marine organisms, growth supporting water and oxygen and food therein, is transported to the open sea, partially filled with water from the open sea and towed to a berthing point. Eggs of marine organisms and food are then introduced into the growth supporting water in the enclosure and a source of continuous oxygen supply is communicated thereto.

4 Claims, 5 Drawing Figures

PATENTED JAN 9 1973
3,709,195
SHEET 1 OF 2
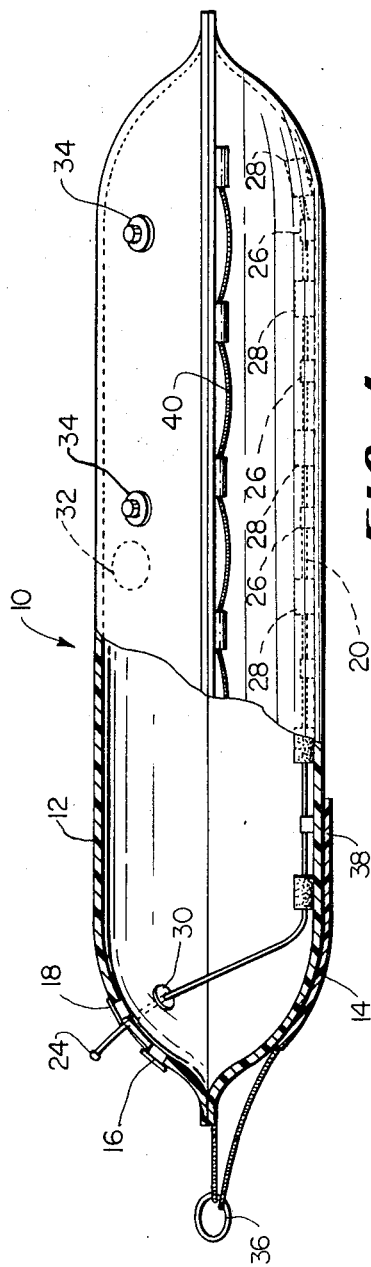
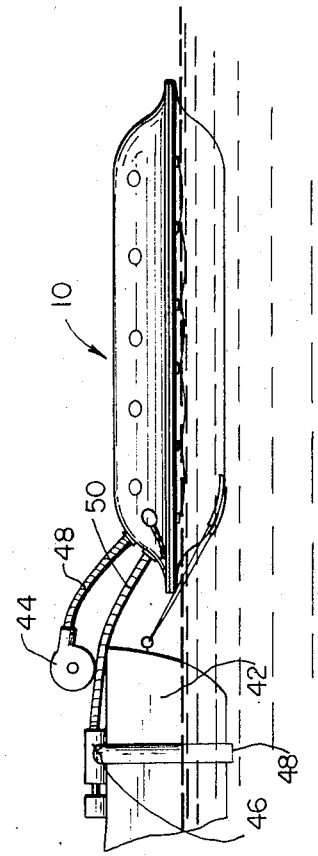
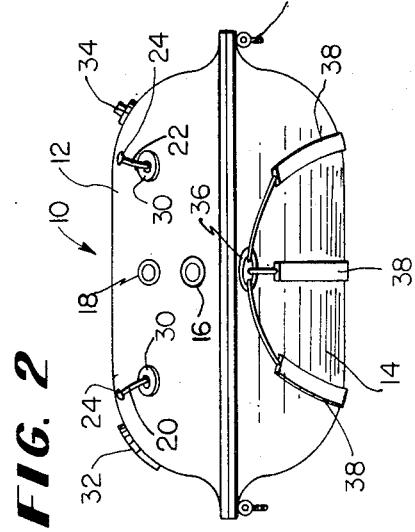
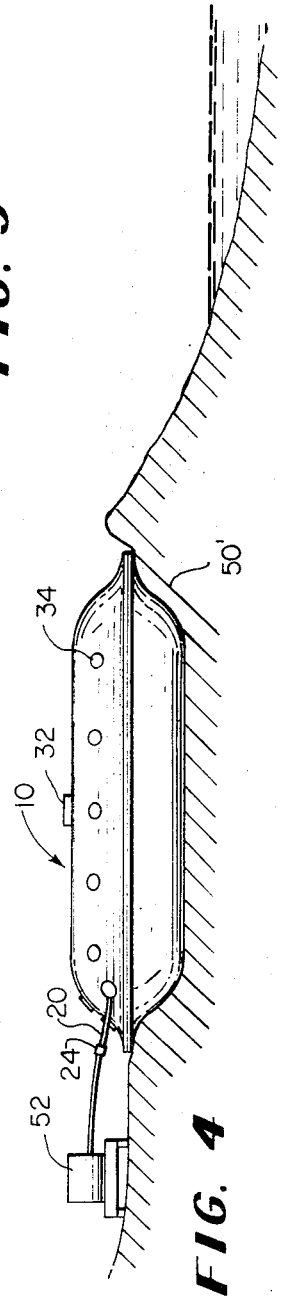
INVENTOR
DURBIN C. TABB
BY Stowell & Stowell
ATTORNEYS

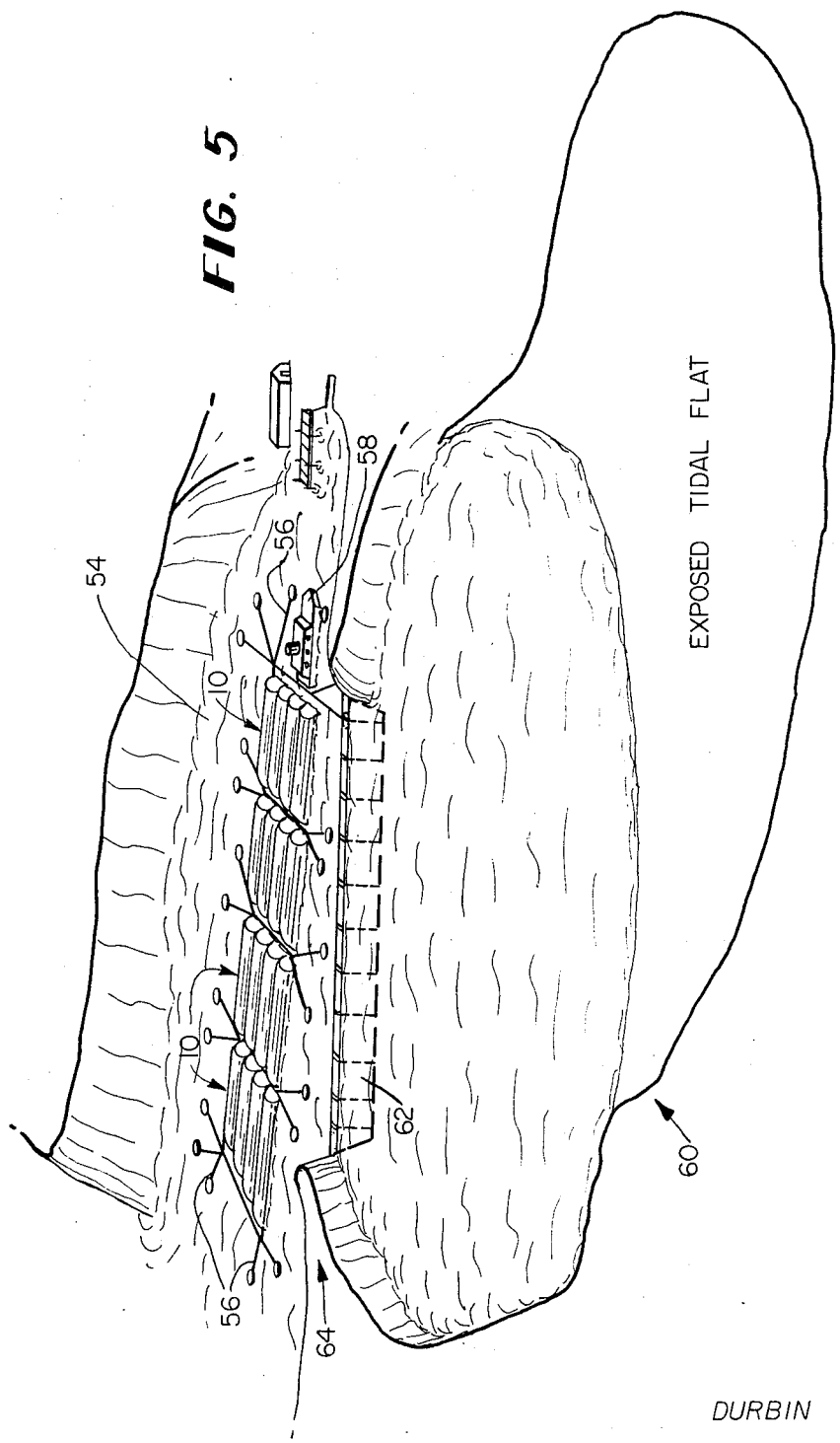

METHOD FOR HATCHING AND GROWING MARINE ORGANISMS

BACKGROUND OF THE INVENTION

With increasing population density, the available supply of food from conventional sources is becoming a critical problem, particularly in the less developed areas of the world. With a limited amount of land area available for food production, it is becoming more important to find supplementary sources of food supply. One of the most readily available sources is the sea and increasing attention is being devoted to the oceans as a primary source of food.

Among the techniques which are being developed for efficient production of food from the sea, is marine "farming" or the growing of marine organisms under controlled conditions in impounded areas. Because containment, supply and protection problems involved in marine farming are less troublesome in inshore or in protected areas, marine farming is best accomplished close to the shore or in inshore lagoons and bays where wave action is minimal.

An important problem related to marine farming close to the short is the presence of organic and inorganic contaminants in the inshore waters. The delicate larvae of most marine animals, including shrimp, crabs and fish, undergo complicated morphological and physiological changes prior to metamorphosis to the juvenile stage. During these critical early-life history stages, the animals require a very high quality culture media or growth-supporting water, free of the contaminants normally present in inshore waters. The best source of uncontaminated salt water is the open sea, however, transport of the immense quantities of water required for large-scale culture operations in an uncontaminated condition could be prohibitively expensive.

Close control of oxygen and temperature conditions and feeding must also be obtained during these early stages if high quality, high production rates are to be attained. Such controls are not readily available in present art impounded area farming systems.

SUMMARY OF THE INVENTION

This invention provides a method and apparatus for growing marine organisms which overcomes the disadvantages of the prior art by furnishing a floatable enclosure which may be readily transported to and from a source of uncontaminated culture media or growth-supporting water.

The invention further provides an enclosure of the type described which may be readily transported by furnishing an inflatable enclosure which is folded for transport to the open sea and inflated and filled for towing back from the open sea.

The invention also furnishes an apparatus for growing marine organisms under closely controlled environmental and feeding conditions by providing a translucent enclosure for containing the growth-supporting water and the larvae with means to supply oxygen and food to the enclosure during the growth cycle.

The invention also provides a relatively inexpensive enclosure for growing marine organisms which is readily transportable by furnishing a translucent, inflatable plastic container which is provided with towing means and input and supply means for transmitting inflating air, water, and oxygen to the container.

In a preferred embodiment the invention provides an apparatus for growing marine organisms including a floatable, translucent, inflatable enclosure; input means communicating with the enclosure for inflation thereof and supply of organisms, food, and growth-supporting water; and supply means including conduiting and dispensing units spaced throughout the enclosure for continuously supplying oxygen to the water therein.

These and other advantages will become more readily appreciated by those skilled in the art by reference to the following detailed description when viewed in the light of the accompanying drawings, wherein like components throughout the figures are indicated by like numerals and wherein:

BRIEF DESCRIPTION OF THE DRAWINGS

FIG. 1 is a side elevational view, partly in section, of an apparatus in accordance with the invention;

FIG. 2 is a front elevational view of the apparatus of FIG. 1;

FIG. 3 is a reduced elevational view of the apparatus of FIG. 1 showing a stage of deployment thereof;

FIG. 4 is a view similar to FIG. 3 showing a method of berthing an apparatus in accordance with the invention; and FIG. 5 is a reduced perspective view showing another method of berthing plural devices in accordance with the invention.

DESCRIPTION OF THE PREFERRED EMBODIMENT

Referring now to FIG. 1, the apparatus comprises an enclosure, shown generally at 10, and comprised of a flexible top wall 12 and bottom wall 14 seamed together along the mid-portion of the enclosure to form an airtight container. Although the aforedescribed construction is preferred, the enclosure 10 may be fabricated in other ways such, for example, as by means of a seamless tube of material sealed transversely at either end or with a single portion of material seamed along the ends and one side only.

The material must be at least translucent and, in a preferred embodiment, a UV-stable polyethylene of suitable thickness to provide the structural strength required for the invention is used. If desired, the walls, particularly the bottom wall 14, may be reinforced with suitable fabric mesh material and additional layers of abrasion-resistant material may be provided if the use requirements so dictate.

Where the walls are of a thermoplastic material, the device may be fabricated by heat sealing the seams as is known in the art or by heat seal combined with other forms of fabrication.

The top wall 12, or at least the upper surface thereof, is darkened by tinting or other means to admit a maximum of about 700 foot candles of light on clear days.

Quick disconnect water pump and air pump attachment ports 16 and 18 respectively, are disposed through the top wall 12 to provide communication with the interior of the enclosure 10. Such disconnects are well known in the art and generally include a valve means which is spring biased to be normally closed to block flow through the port when connected and which is opened by attachment of a coupling thereto to provide for flow through the port.

Means for providing a continuous, dispersed flow of oxygen to the interior of the enclosure 10 are provided in the form of parallel lines 20 and 22 (FIG. 2) on the interior floor of the enclosure. The conduits extend through the top wall 12 and terminate in quick disconnect couplings 24 at the ends thereof. The conduits include a plurality of dispensing points comprising porous members 26, known as "air stones," spaced along the length thereof. The conduits are fastened to the floor by means of anchoring members 28 intermediate the stones 26 and attached to the bottom wall 14 by heat seal or any other suitable means. The stones 26 may be natural stones of pumice or other porous material or may be fabricated artificially as desired. The points of wall penetration by the lines 20 and 22 are provided with a seal 30 to preserve the integrity of the enclosure 10.

An air lock access 32 is provided in the upper area of the enclosure 10 to furnish means for introduction of starter cultures, eggs and nutrient solutions. An air lock approximately one foot in diameter is sufficient for enclosures of minimum size (30 metric tons of hatching water).

To maintain structural integrity it is necessary to allow for thermal expansion, barometric pressure changes and other sources of over pressure. Such allowance is provided by pressure relief vents 34 disposed along the upper surface of the enclosure 10 and communicative with the interior thereof. The vents 34 may be of any kind standard in the art but are preferably pressure relief valves of the spring actuated, manual reset type.

The enclosure 10 is provided with external handing means in the form of a towing bridal 36, connected to the lower forward surface of the enclosure by plural lines 38 suitably attached to the bottom wall 14, and hand hold lines 40 attached along the sides of the enclosure.

The enclosure may be of any size required to contain the desired organism population and consistent with handling requirements. It is envisioned that one size enclosure or hatching bag will be utilized for production of post larval shrimp, crabs or fish which are then, at the proper stage, transferred to larger growing bags for growing out the crop or for intermediate growth prior to release into coastal impoundments.

Quantitatively, a hatching bag 10 meters long by 3 meters wide by 2 meters high will contain, when half filled, approximately 30 metric tons of hatching or growth supporting water. Such an enclosure has a production capacity at a rate of 250,000 to 300,000 post larvae per metric ton, of 7,500,000 to 9,000,000 stockable post larvae. Growing bags would preferably have twice the hatching bag capacity or 60 metric tons of growth supporting water.

For a hatching bag of the above capacity, the stones 26 should be spaced one-half meter apart along the conduits 20 and 22 which in turn are comprised of ⅛ inch diameter flexible tubing. To adequately support the growth of the organisms, the required rate of supply of air to the stones should be approximately 0.4 ft.$^3$ per minute which necessitates, for hatching bags, a supply of air at 50 c.f.m. and at approximately 10 p.s.i. The source of air should be free of oil or other contaminants. It has been found that two "Gast" air compressors (Model No. 3040) producing 25 c.f.m. at 10 p.s.i. are, for example, suitable for such supply. These pumps are driven by single phase 1 ½ h.p. electric motors and are suitable for continuous operation.

In operation, and with reference to FIG. 3, the system is placed into operation by deployment of an enclosure 10 from the stern of a work boat 42 at a position sufficiently off shore to preclude the intake of contaminated water. Plural enclosures 10 are preferably stored on the work boat in a folded condition and are sequentially unfurled and filled and then towed back to the berthing area.

Once deployed, an air blower 44 and a large capacity, low head water pump 46 are connected to the water and air ports 16 and 18 in the enclosure by means of flexible conduits 48 and 50, respectively. The blower 44 then is energized to inflate the enclosure for flotation thereof and the pump 46 is energized to pump sea water from the intake 48 to fill the enclosure 10 to approximately one-half capacity. The enclosure 10 is preferably kept "close hauled" during towing to minimize the possibility of porpoising.

Once the enclosure 10 is provided with water and returned to a protected area, it is berthed, provided with a continuous oxygen supply and a charge of eggs to be hatched and food. In FIG. 4, one method of berthing the enclosure 10 is illustrated. In the figure, the enclosure is nested in a depression 50' formed in a sandy beach and provided with oxygen by means of a pump 52 connected to the lines 20 and 22. Such an installation could include plural spaced enclosures 10 with additional interspersed containers, of similar construction, containing cultures of diatoms or like food which can be transferred as needed to the enclosures by means of conduiting and water pumps. Once the hatching or growing use of such installations is completed, the enclosures 10 could be converted, by providing condensate trapping troughs along the walls thereof, to make fresh water providing solar stills for arid areas.

Another method of berthing the enclosures is illustrated in FIG. 5. In the figure, plural enclosures 10 are rafted and anchored by anchors 56 in a sheltered lagoon 54 free from wave action and adjacent an exposed tidal flat impoundment 60 to which the post larvae can be released for subsequent maturation.

The lagoon 54 is separated from the tidal flat 60 by gates 62 in the man made levee 64. With this arrangement the filled bags 10 would be towed through the gates 62 at high tide, then the gates would be closed until such time as for example the shrimp are to be released for subsequent maturation.

With the rafted arrangement, it is anticipated that a network of piers or walkways can be provided for each series of enclosures to furnish access for servicing, food supply, etc. It is also anticipated that a service facility in the form of a barge 58 or the like may be provided to furnish, under controlled lighting and temperature conditions, means to incubate and maintain germinal material, mass cultures of diatoms or other food species and storage facilities for chemicals and growth media.

It is also anticipated that the enclosures 10, may be made much larger than described above and that the air lock access 32 may be of sufficient size to permit the entry of personnel for observation and servicing of the developing larvae. In such case, a plastic skiff may be included in the enclosure to provide mobility for personnel.

It should be understood that what has been described is intended as exemplary of teachings in accordance with the invention to enable those skilled in the art in the practice thereof.

What is new and desired to be protected by Letters Patent of the United States is:

1. A method of growing marine organisms comprising the steps of:

carrying an inflatable enclosure in a collapsed state to a selected water area;

disposing said enclosure in the water and filling it with air to provide flotation thereof in the water;

filling said floating enclosure with some of the water in which it is floating so as to provide a growth supporting water media in the enclosure;

anchoring said water containing enclosure in a sheltered manner in the water area;

supplying marine organism eggs and food to said enclosure; and, continuously supplying oxygen to said enclosure to support growth of said organisms.

2. A method of growing marine organisms comprising the steps of:

transporting an enclosure to a point on the open sea;

filling said enclosure with air to provide flotation thereof;

filling said enclosure approximately half full with water from the open sea to provide a growth supporting media therein;

towing said enclosure to a sheltered point for berthing;

supplying marine organism eggs and food to said enclosure; and continuously supplying oxygen to said enclosure to support growth of said organisms.

3. A method in accordance with claim 2 wherein said organisms are transferred in the post larval stage to a controlled growing enclosure.

4. A method in accordance with claim 2 wherein plural enclosures are berthed in adjacent relationship for supply from a common source.

* * * * *